US009807438B2

(12) United States Patent
Hussain et al.

(10) Patent No.: US 9,807,438 B2
(45) Date of Patent: Oct. 31, 2017

(54) VIDEO ON DEMAND GIFTING

(75) Inventors: Aarif Mohamed Hussain, Chennai (IN); Subramanyam Manda, Hyderabad (IN); Kunthunathan Virushabadoss, Chennai (IN); Nazeer Mahaboobjan, Chennai (IN); Arjun Baskaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 708 days.

(21) Appl. No.: 13/370,350

(22) Filed: Feb. 10, 2012

(65) Prior Publication Data

US 2013/0212610 A1    Aug. 15, 2013

(51) Int. Cl.
*H04N 21/254* (2011.01)
*H04N 21/478* (2011.01)
*H04N 21/4784* (2011.01)
*G06Q 30/06* (2012.01)

(52) U.S. Cl.
CPC ......... *H04N 21/2542* (2013.01); *G06Q 30/06* (2013.01); *H04N 21/4784* (2013.01); *H04N 21/47815* (2013.01)

(58) Field of Classification Search
CPC ......... H04N 21/4784; H04N 21/47815; H04N 21/2542; G06Q 30/06
USPC ...... 725/23, 63, 135; 705/7.29, 41, 12, 26.1, 705/27.1
See application file for complete search history.

(56) References Cited

U.S. PATENT DOCUMENTS

| | | | | |
|---|---|---|---|---|
| 2002/0144273 A1* | 10/2002 | Reto | .................. | H04L 29/06027 725/86 |
| 2006/0190966 A1* | 8/2006 | McKissick | ............. | G06Q 30/02 725/61 |
| 2008/0189189 A1* | 8/2008 | Morgenstern | .......... | G06Q 30/02 705/12 |
| 2009/0132383 A1* | 5/2009 | Piepenbrink | ......... | G06Q 20/102 705/26.1 |
| 2010/0192179 A1* | 7/2010 | Ellis | .................... | H04N 5/44543 725/40 |
| 2011/0060661 A1* | 3/2011 | Chai | .................. | G06Q 30/0603 705/27.1 |
| 2011/0197221 A1* | 8/2011 | Rouse et al. | ..................... | 725/32 |
| 2013/0042263 A1* | 2/2013 | Reynolds | ........... | G06Q 30/0207 725/23 |

* cited by examiner

*Primary Examiner* — Brian T Pendleton
*Assistant Examiner* — Alan Luong

(57) ABSTRACT

A system receives, from a first user device associated with a giver, a request for a video-on-demand (VOD) gift, wherein the request identifies a recipient and a VOD selection. The system creates a billing event corresponding to the VOD gift, for an account associated with the giver, and generates a coupon code for the VOD gift. The coupon code is associated with the identified recipient and the VOD selection. The system sends, to a second user device associated with the recipient, an indication of the VOD gift that includes the coupon code. The system receives, from a third user device associated with the recipient, the coupon code and provides, to the third user device, information to enable access to VOD content corresponding to the coupon code.

20 Claims, 14 Drawing Sheets

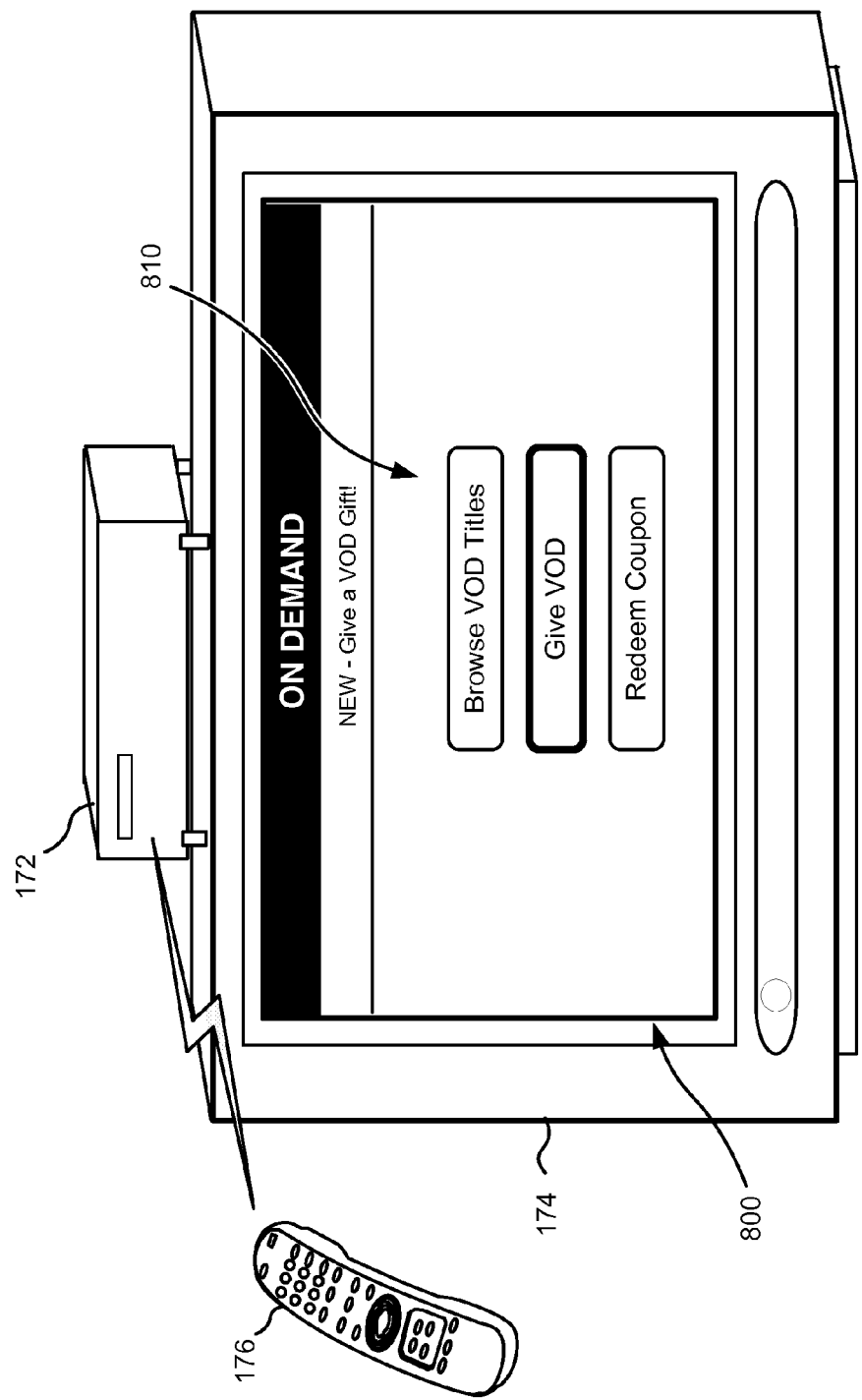

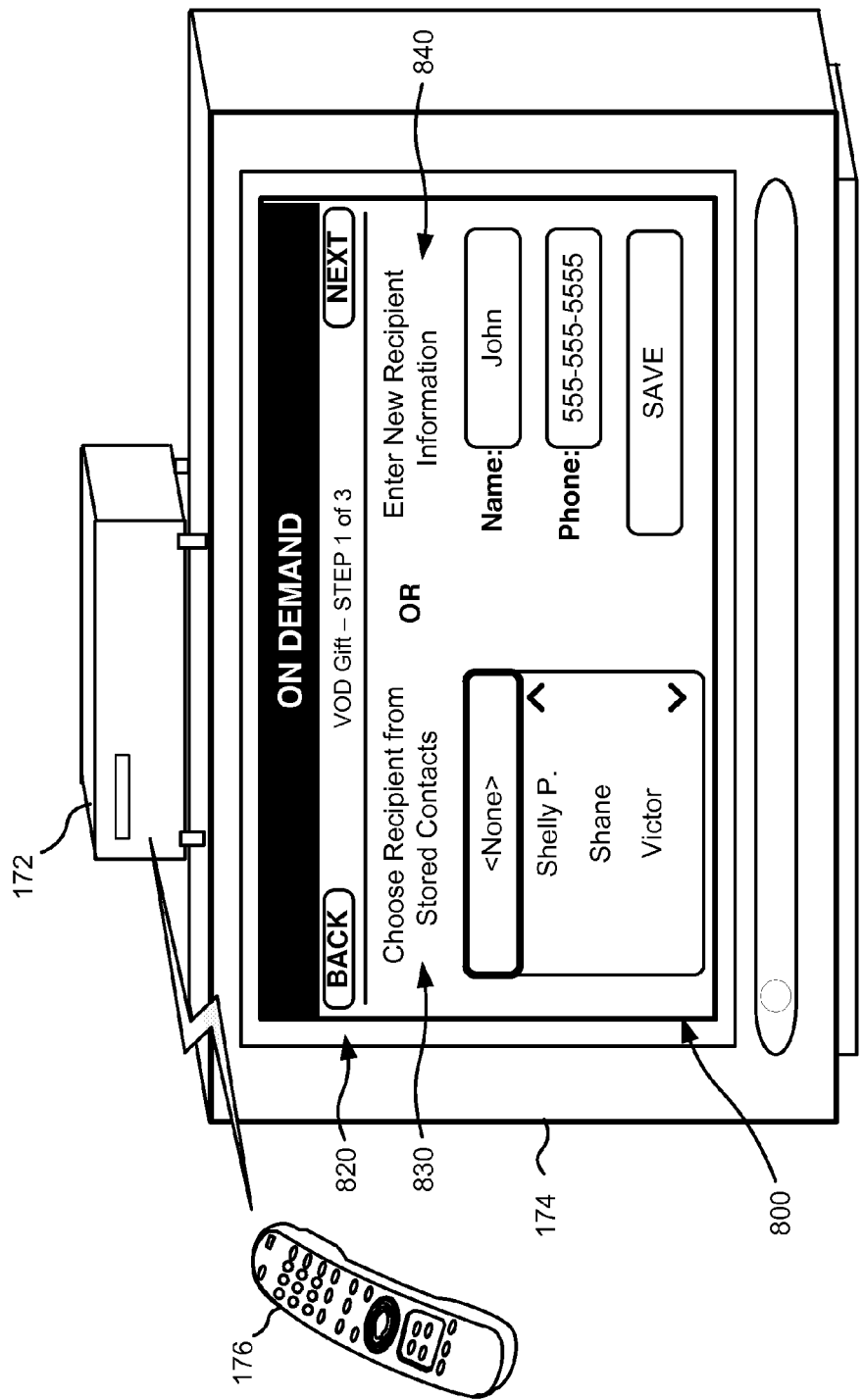

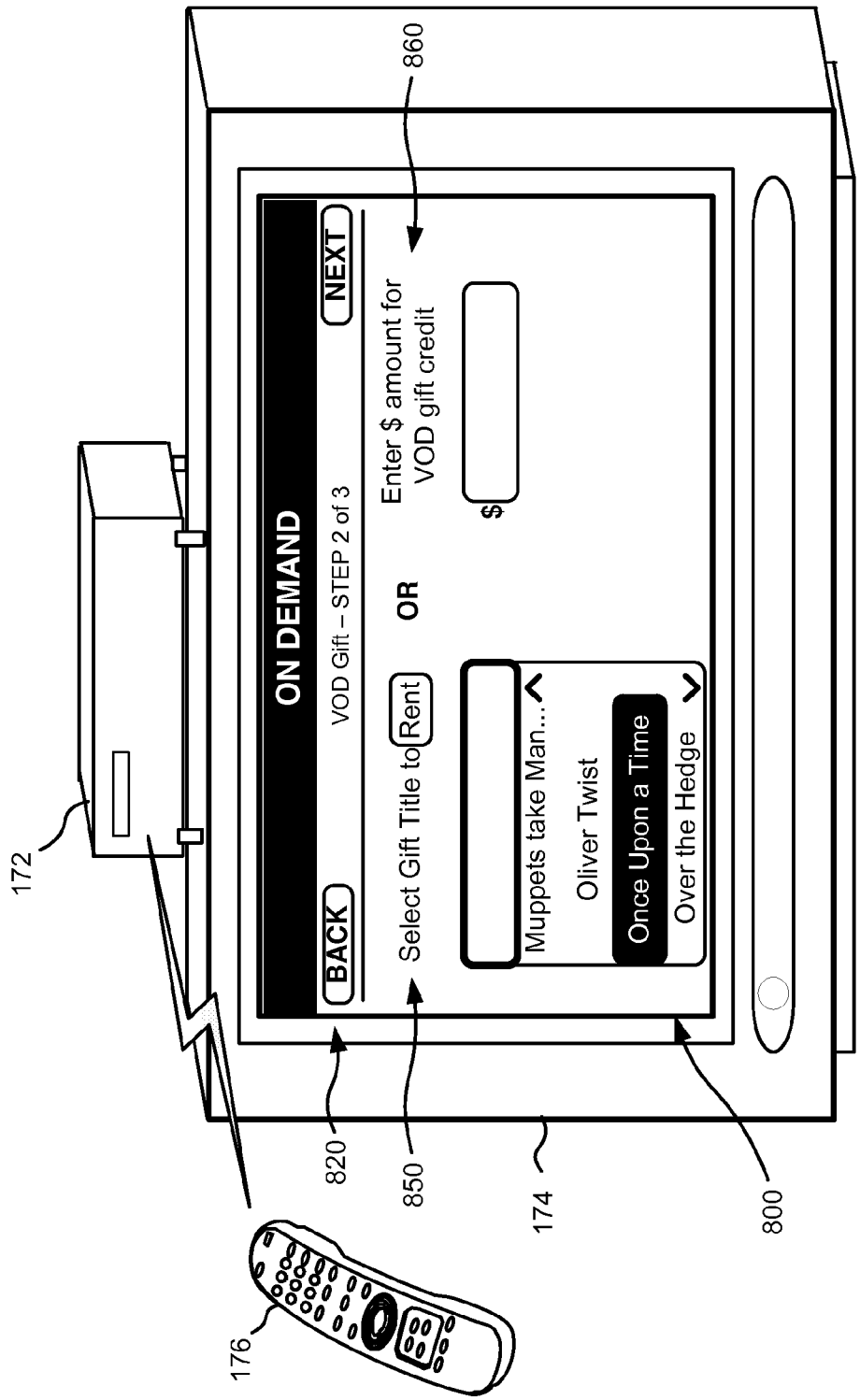

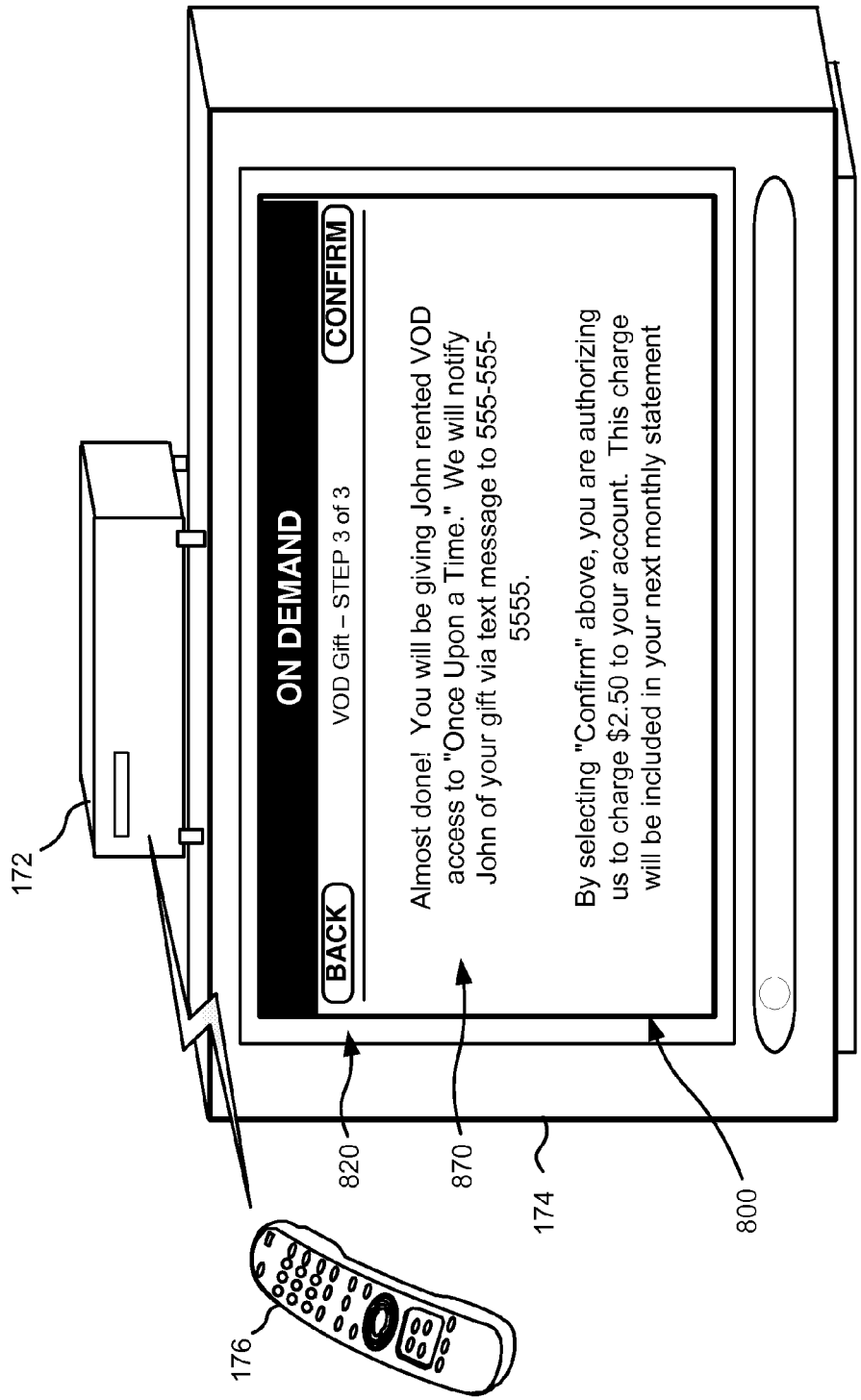

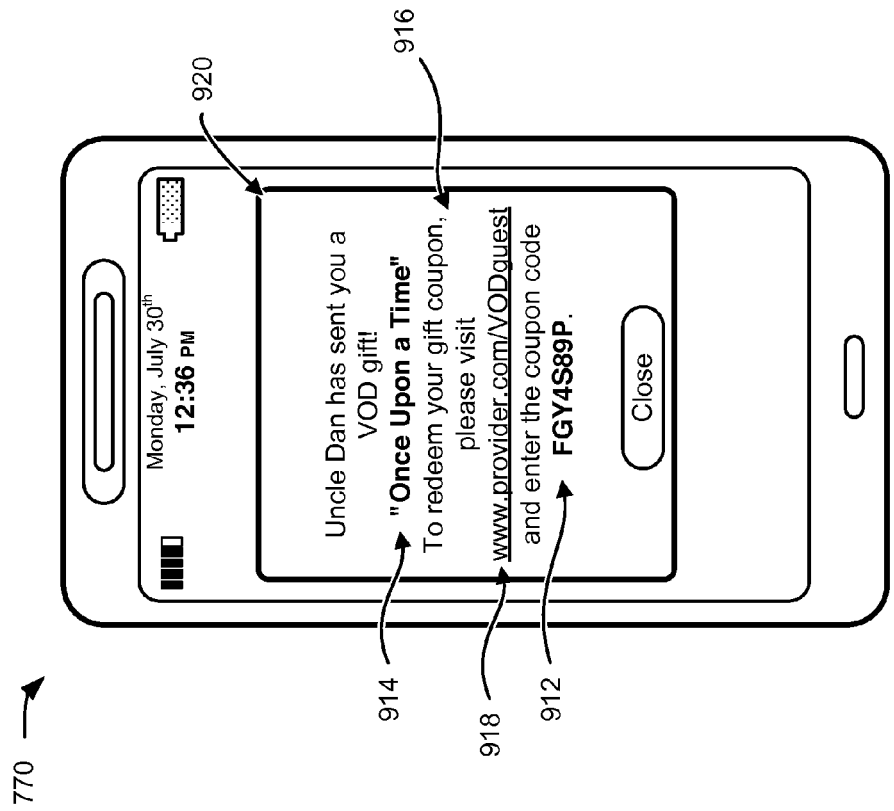

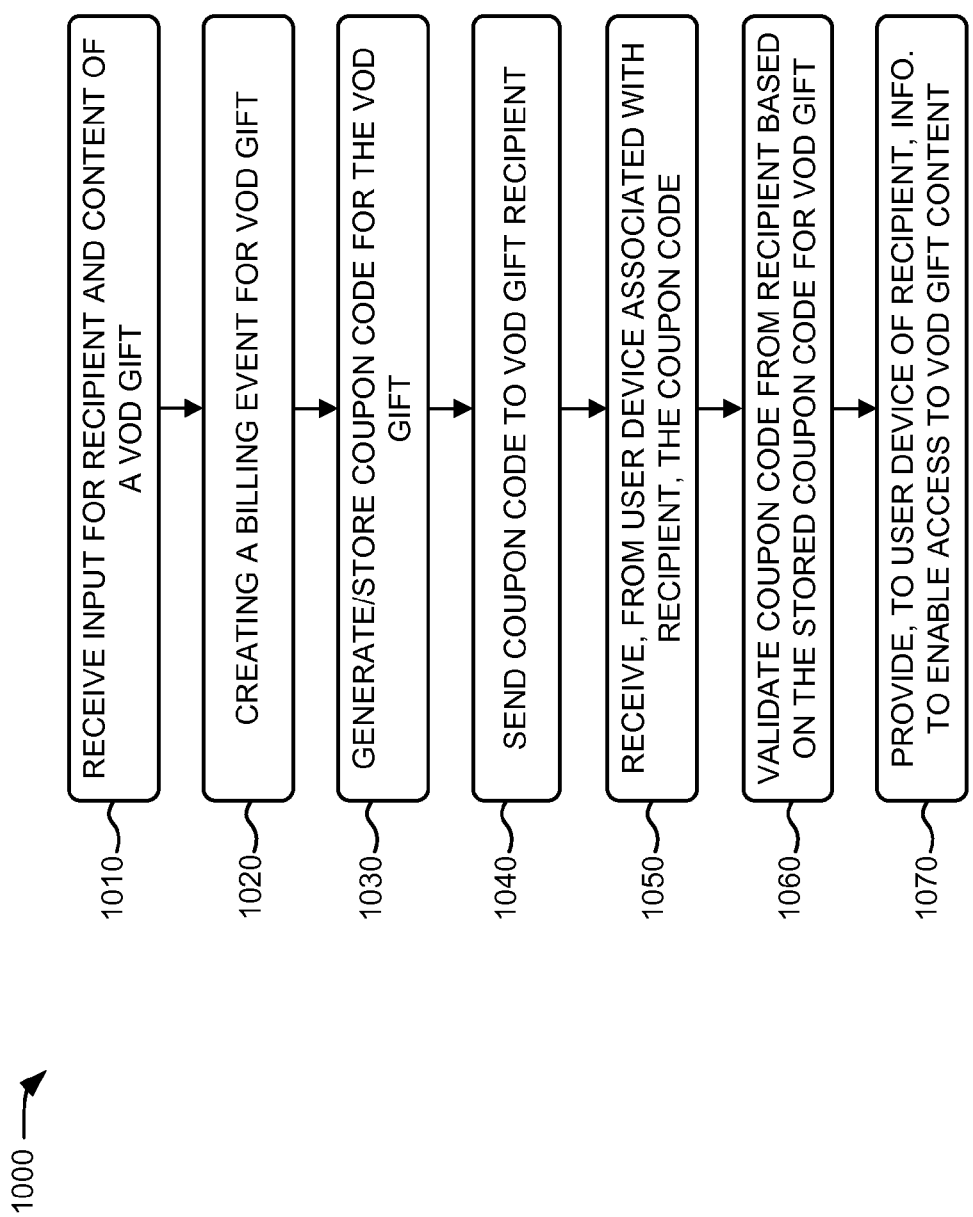

VIDEO ON DEMAND GIFTING

BACKGROUND

Video-on-demand (VOD) is a system which allows users of a subscription television service to select and watch selected video content on demand. Internet Protocol Television (IPTV) technology can be used to bring VOD to televisions or personal computers. In some cases, VOD content is streamed through a set-top box (STB) or another computing device. In other cases, VOD content can be downloaded and stored on a user's device (e.g., a digital video recorder (DVR) or memory associated with a mobile computer, personal computer, etc.).

BRIEF DESCRIPTION OF THE DRAWINGS

FIGS. 8A-8D are diagrams of user interfaces for purchasing a VOD gift;

FIGS. 9A and 9B are diagrams of user interfaces for providing notification to a VOD gift recipient; and FIG. 10 is a flowchart of an exemplary process for providing and implementing gift VOD coupons, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may allow customers (e.g., customers of a subscription television service provider) to purchase and provide video-on-demand (VOD) gifts to selected recipients. In one implementation, the systems and/or methods may receive, from a first user device associated with a giver (e.g., the giver's STB), a request for a VOD gift, wherein the request identifies a recipient and a VOD selection. The systems and/or methods may create a billing event (e.g., corresponding to the VOD gift) for an account associated with the giver and may generate a coupon code for the VOD gift. The coupon code may be associated with the identified recipient and the VOD selection. The systems and/or methods may send, to a second user device associated with the recipient (e.g., the recipient's mobile phone), an indication of the VOD gift that includes the coupon code. The systems and/or methods may receive, from a third user device associated with the recipient (e.g., the recipient's STB), the coupon code and provide, to the third user device, information to enable access to VOD content corresponding to the coupon code.

Figure 1:
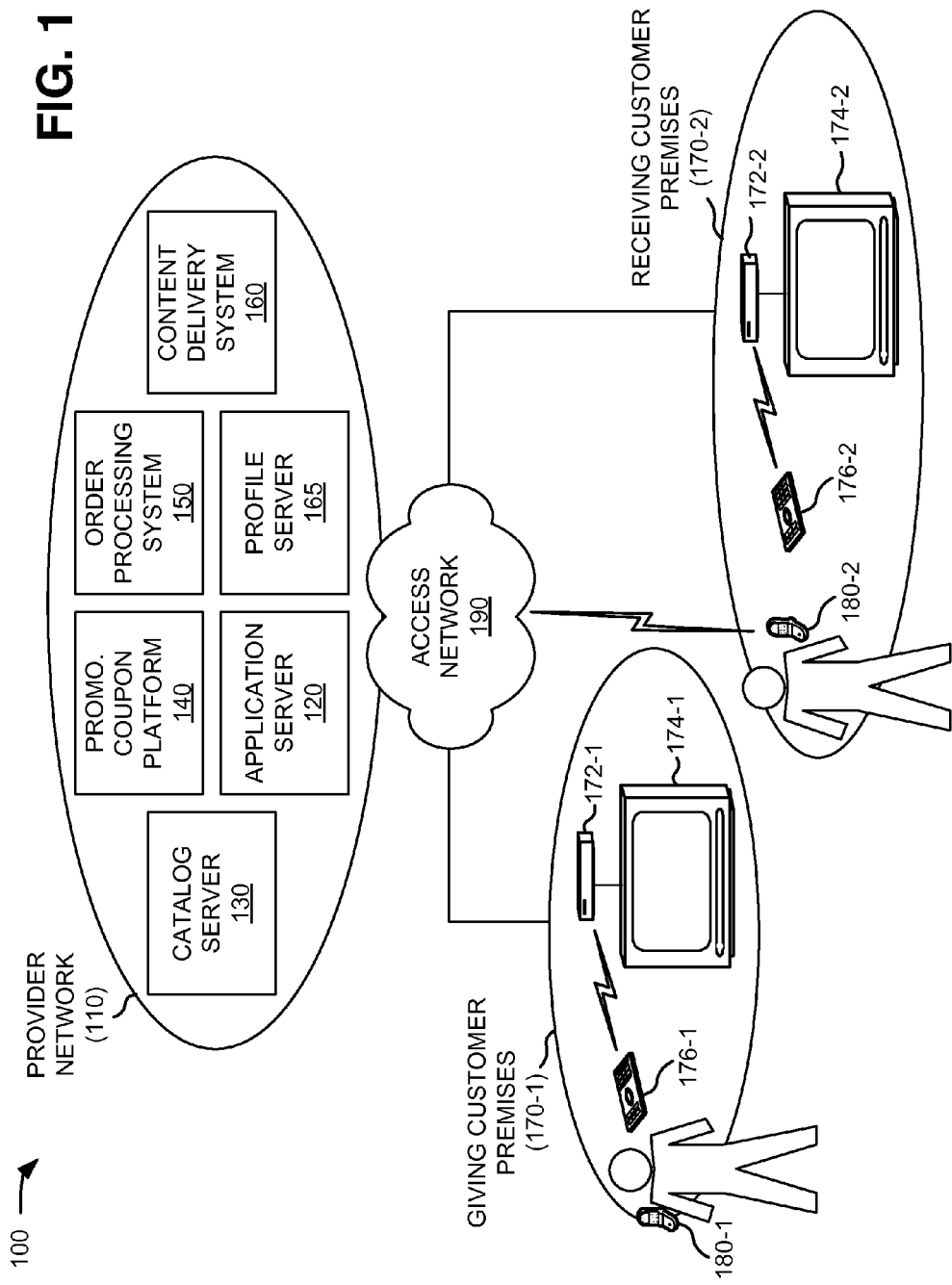
FIG. 1 illustrates an exemplary network in which systems and/or methods described herein may be implemented.

FIG. 1 is a diagram that illustrates an exemplary network 100 in which systems and/or methods described herein may be implemented. As shown in FIG. 1, network 100 may include a provider network 110 with an application server 120, a catalog server 130, a promotional coupon platform 140, an order processing system 150, a content delivery system 160, and a profile server 165. Network 100 also includes multiple customer premises 170-1 and 170-2 (referred to herein generically as "customer premises 170" and collectively as "customer premises 170") and an access network 190. Each customer premises 170 may include a media client 172, a display device 174, a user interface device 176, and a communication device 180. Devices and/or networks of FIG. 1 may be connected via wired and/or wireless connections.

The components of FIG. 1 are illustrated for simplicity. In practice, there may be more provider networks 110, application servers 120, catalog servers 130, promotional coupon platforms 140, billing systems 150, content delivery systems 160, profile servers 165, customer premises 170, media clients 172, display devices 174, user interface devices 176, communication devices 180, and access networks 190. For example, there could be thousands or millions of customer premises 170. Also, in some instances, a component of network 100 may perform one or more functions described as being performed by another component or group of components of network 100.

Provider network 110 may include a network that distributes or makes available services, such as, for example, television services, mobile communication services, and/or Internet services. Provider network 110 may be a satellite-based network and/or a terrestrial-based network. In implementations described herein, provider network may support VOD services for customers of provider network 110. Provider network 110 may include, for example, application servers (e.g., application server 120), content information servers (e.g., catalog server 130), customer information servers (e.g., profile server 165), content storage and distribution devices (e.g., content delivery system 160), billing devices (e.g., order processing system 150), security/licensing devices, advertising information servers, etc.

Application server 120 may include one or more network devices, or other types of computation or communication devices (e.g., a server device, an application server device, a Web server device, a database server device, a computer, etc.), to provide a backend support system for applications residing on, for example, media client 172. For example, application server 120 may permit media client 172 to download a gift coupon application that may permit a user to find content of interest and purchase VOD content for use by another. The gift coupon application may enable media client 172 to present to a user of media client 172 information received from catalog server 130 in an interactive format to allow selection of particular content. In one implementation, application server 120 may include interactive media guide functionality. For example, application server 120 may provide content metadata, such as lists or categories of content. Additionally, application server 120 may authenticate a user who desires to purchase, rent, or order coupons for VOD content.

Catalog server 130 may include one or more network devices, or other types of computation or communication devices, to provide a catalog of VOD content for users (e.g., users of media client 172) to consume (e.g., buy, rent, or order coupons for). In one implementation, catalog server 130 may collect and/or present listings of content available for a particular a recipient user (e.g., a selected recipient for a VOD coupon, based on subscription packages, physical equipment, etc., associated with the recipient user account). For example, catalog server 130 may receive content metadata, such as lists or categories of VOD content, from content delivery system 160. Catalog server 130 may use the content metadata to provide currently-available content options to media client 172. Catalog server 130 may provide the content metadata to media client 172 directly or may communicate with media client 172 via application server 120.

Promotional coupon platform 140 may include one or more network devices, or other types of computation or communication devices, to generate and/or validate coupon codes for VOD gift coupons. In one implementation, promotional coupon platform 140 may receive an indication of a VOD gift selection (e.g., from media client 172-1) for use or redemption by a particular user (e.g., a user of media client 172-2). For example, promotional coupon platform 140 may identify a unique alphanumeric sequence to associate with the selected VOD gift content and/or recipient user. Additionally, promotional coupon platform 140 may generate a message (e.g., a Short Message Service (SMS) message, an email message, etc.) to the recipient user to notify the user of the gifted VOD coupon.

Order processing system 150 may include one or more network devices, or other types of computation or communication devices, to manage charging users for services provided via network 100. Order processing system 150 may include, for example, a service delivery and management platform, a mediation framework, and/or a billing system.

Content delivery system 160 may include one or more network devices, or other types of computation or communication devices, that store and deliver content to customers (e.g., to devices at customer premises). The content may include, for example, television broadcasts, VOD programming, or other video content.

Profile server 165 may include one or more network devices, or other types of computation or communication devices, to store user profile information for users (e.g., users of media clients 172). The user profile information may include various information regarding a user, such as login information (e.g., a user identifier and a password), billing information, address information, types of services to which the user has subscribed, a list of digital content purchased by (or given to) the user, a list of video content rented by (or given to) the user, a list of video content to which the user has subscribed (or has received a gift subscription), a user device identifier (e.g., a media player identifier, a mobile device identifier, a set top box identifier, a personal computer identifier) for media client 172, a video application identifier associated with the video application obtained from application server 120, or the like. Application server 120 may use the user profile information from profile server 165 to authenticate a user and may update the user profile information based on the user's activity.

Customer premises 170 may include devices (e.g., media client 172, display device 174, user interface device 176, etc.) and other equipment (such as routers, cables, splitters, etc., not shown) for a home network. Customer premises 170 may connect to provider network 110 via access network 190.

Media clients 172 may include a STB, a television, a laptop computer, a tablet computer, a personal computer, a game console, a personal communications system (PCS) terminal (e.g., that may combine a cellular radiotelephone with data processing and data communications capabilities), a PDA (e.g., that can include a radiotelephone, a pager, Internet/intranet access, etc.), a smartphone, or other types of computation and/or communication devices. In one implementation, media clients 172 may include a client application that allows a user to interact with a media client 172 to order and/or receive VOD content. In some implementations, media clients 172 may also include a client application to allow video content to be presented on a display device 174. Media clients 172 may be offered as a standalone device or application interface in a multi-purpose device, such as a computer or a smartphone.

Display devices 174 may include a digital or analog display via which a user may view multimedia content (including, for example, VOD content). Display devices 174 may refer to any device that can receive and display multimedia content delivered over access network 190 and/or through media clients 172 for perception by users.

User interface devices (or remote control) 176 may issue wired or wireless commands for controlling other electronic devices, such as media clients 172 and/or display devices 174. In one implementation, a user may interact with a media client 172 using a keypad that is part of user interface device 176, and signals representing key depressions may be transmitted to the media client 172 via an infrared transmission or another type of transmission. User interface devices 176 may allow a user to navigate a program guide, select channels or programs for viewing, adjust display characteristics, order VOD content/coupons, and/or perform other interactive functions related to viewing content provided over access network 190. In other implementations, user interface devices 176 may be incorporated in a multifunction device, such as a smartphone (e.g., communications device 180).

Communication devices 180 may include a mobile phone, a tablet computer, a laptop, a smart phone, or a personal computer another communication device. In one implementation, communication devices 180 may be configured to receive SMS messages, instant messages (IMs), mobile IMs (MIMs), and/or email messages, such as VOD coupon messages from promotional coupon platform 140.

Access network 190 may generally include a local area network (LAN), a wide area network (WAN), a metropolitan area network (MAN), a wireless network, an optical fiber (or fiber optic)-based network, a cable television network, a satellite television network, or a combination of networks. Access network 190 may include an Internet Protocol (IP)-based network. In some implementations, access network 190 may be a private network controlled by, for example, a telecommunications company that provides television, telephone, and/or data access to customer premises 170. In another implementation, access network 190 may be a public network, such as the Internet, or a combination of public and private networks.

Techniques described herein may be used to allow users (e.g., users of media client 172) to provide VOD gifts to other recipient users. In one implementation, the recipient users may be customers of the same provider network. In other implementations (described further herein), the recipient users may be out-of-franchise users.

In operation, a user at giving customer premises 170-1 may desire to provide a VOD gift to another user (e.g., a user at receiving customer premises 170-2). A VOD gift may include, for example, a rental or purchase of a particular VOD title, a rental or purchase of a VOD series, a monetary credit for VOD use, etc. The giving user may access a gift coupon application via media client 172-1, causing media client 172-1 to obtain a listing of VOD gift selections from provider network 110 (e.g., catalog server 130). The giving user may use media client 172-1, display device 174-1, and user interface device 176-1 to identify a particular recipient (e.g., via an address book or similar functionality on media client 172-1) and select a particular VOD gift. Media client 172-1 may provide the VOD gift and recipient selection to provider network 110 for processing and distribution.

Indications of the VOD gift may be provided to promotional coupon platform 140 and order processing system 150. Promotional coupon platform 140 may generate a coupon code for the particular VOD gift and may forward the coupon code, along with use instructions, to the recipient. In one implementation, the coupon code/instructions may be provided to a different device (e.g., communication device 180-2) or application (e.g., an email application) than that of media client 172-2. Order processing system 150 may generate a billing event for the VOD gift, mediate the transaction, and bill the giving user's account for the transaction.

After receiving the coupon code/instructions from promotional coupon platform 140 (e.g., via communications device 180-2), the recipient user may use media client 172-2, display device 174-2, and user interface device 176-2 to provide the coupon code to provider network 110 (e.g., application server 120). Application server 120 may, upon receipt of the coupon code, provide the coupon code to promotional coupon platform 140 for validation. Assuming promotional coupon platform 140 is able to validate the coupon, application server 120 may update the recipient user's profile in profile server 165 and provide access to the VOD content associated with the coupon code. In one example, application server 120 may provide an address or link that media client 172-2 may use to retrieve content from content delivery system 160.

Although FIG. 1 shows exemplary components of network 100, in other implementations, network 100 may include fewer components, different components, differently arranged components, or additional components than depicted in FIG. 1. For example, in one implementation, devices in a customer premises 170 (e.g., media client 172, display device 174, and user interface device 176) may be combined with communications device 180.

Figure 2:
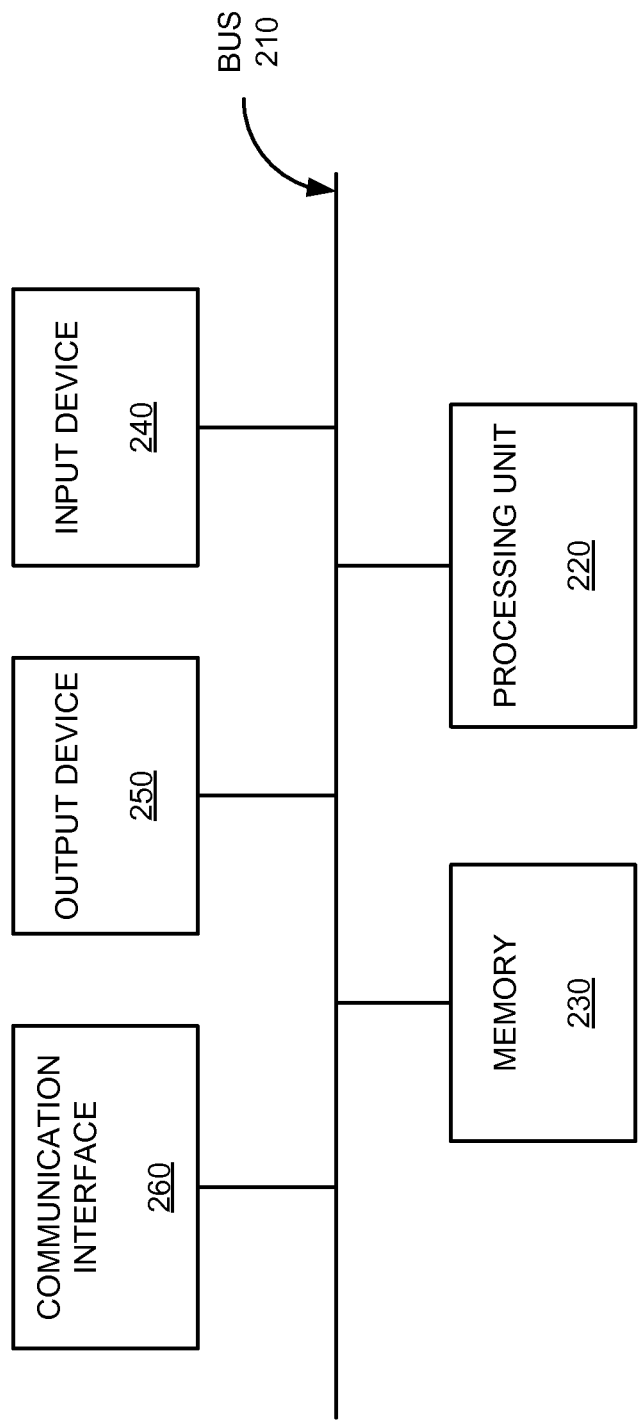
FIG. 2 is a diagram of exemplary components of a device that may be used within the network of FIG. 1.

FIG. 2 is a diagram of exemplary components of a device 200. Device 200 may correspond to application server 120, catalog server 130, promotional coupon platform 140, order processing system 150, content delivery system 160, profile server 165, media client 172, user interface device 176, or communication device 180. Each of application server 120, catalog server 130, promotional coupon platform 140, order processing system 150, content delivery system 160, profile server 165, media client 172, user interface device 176, or communication device 180 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver (e.g., a transmitter and/or receiver) that enables device 200 to communicate with other devices and/or systems. For example, communication interface 260 may include mechanisms for communicating with other devices, such as other devices of network 100 or another device 200.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
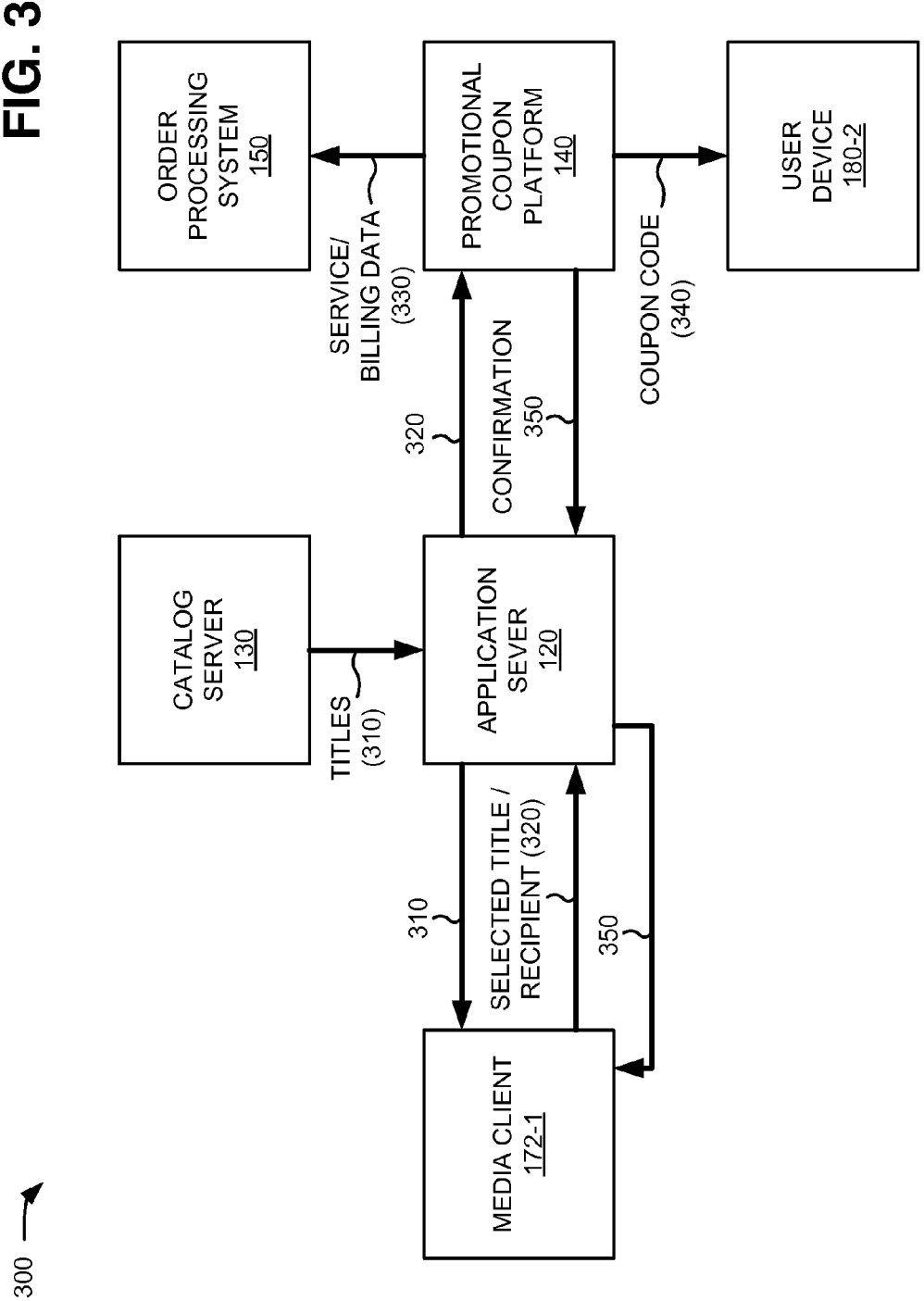
FIG. 3 is a diagram of exemplary interactions between components of an exemplary portion of the network depicted in FIG. 1.

FIG. 3 depicts a diagram of exemplary interactions among components of an exemplary portion 300 of network 100. As illustrated, network portion 300 may include application server 120, catalog server 130, promotional coupon platform 140, order processing system 150, media client 172-1, and communication device 180-2. Application server 120, catalog server 130, promotional coupon platform 140, order processing system 150, media client 172-1, and communication device 180-2 may include the features described above in connection with one or more of FIGS. 1 and 2.

Catalog server 130 may provide, to application server 120, titles 310 and/or other metadata related to VOD content available for gifting. Titles 310 may be provided, for example, upon request from application server 120 (e.g., triggered by a user request from media client 172-1) or as part of a periodic update. Application server 120 may then provide titles 310 to media client 172-1. For example, a user of media client 172-1 may launch a gift coupon application and/or navigate (e.g., via remote control 176-1, not shown in FIG. 3) a user interface menu to a "VOD gifting" selection that can trigger application server 120 to provide titles 310.

Media client 172-1 may present titles 310 to a user and solicit a title selection and a gift recipient. For example, a user of media client 172-1 may use remote control 176-1 to select a particular title or series of VOD titles from the list of titles 310. Additionally, or alternatively, the user may identify a monetary value of VOD purchases to credit to a recipient's account. The user may also input information to identify a recipient of the particular title. In one implementation, a recipient may be identified using a name and contact information, such as a phone number or email address. In another implementation, the recipient may be identified by selecting from a list of previously identified contacts associated with the user's account (e.g., an address book or contact list). Contacts may be available, for example, from profile server 165 (not shown in FIG. 3). The user's selection of the particular VOD title (or title series or monetary VOD value) and recipient may be forwarded by media client 172-1 to application server 120, as indicated by reference number 320.

Application server 120 may receive the selected title and recipient information 320 and may forward the selected title and recipient information 320 to promotional coupon platform 140. Promotional coupon platform 140 may generate a gift VOD (GVOD) coupon code corresponding to selected title and recipient information 320. More particularly, promotional coupon platform 140 may generate a unique alphanumeric sequence (which may correspond to a random value or a hash value based on the user, recipient, title, etc.) that is associated with the selected title and recipient information 320.

Assuming, the GVOD coupon is successfully created, promotional coupon platform 140 may forward service and billing data 330 to order processing system 150. For example, service and billing data 330 may include the giving user information and VOD title information to permit the user's account to be charged for the GVOD coupon. In one implementation, a GVOD order may be processed and billed to a user's account in the same manner that a subscriber would be charged for ordering and personally viewing VOD content. Order processing system 150 is described further below in connection with FIG. 6.

Promotional coupon platform 140 may forward the GVOD coupon to a recipient user's device using the contact information provided in selected title and recipient information 320. For example, if selected title and recipient information 320 includes a phone number that supports text messaging, promotional coupon platform 140 may provide coupon code 340 to user device 180-2. In one implementation, coupon code 340 may be included with additional information, such as instructions for using the GVOD coupon, a name of the giving user, etc.

Promotional coupon platform 140 may also generate a confirmation 350 to indicate to the user of media client 172-1 that the GVOD coupon was successfully generated and/or transmitted to the recipient. Assuming the GVOD coupon is successfully created, promotional coupon platform 140 may send confirmation 350 to application server 120. Application server 120 may, in turn, forward confirmation 350 to media client 172-1 for presentation to the user.

Although FIG. 3 shows exemplary components of network portion 300, in other implementations, network portion 300 may include fewer components, different components, differently-arranged components, and/or additional components than depicted in FIG. 3. Alternatively, or additionally, one or more components of network portion 300 may perform one or more other tasks described as being performed by one or more other components of network portion 300.

Figure 4:
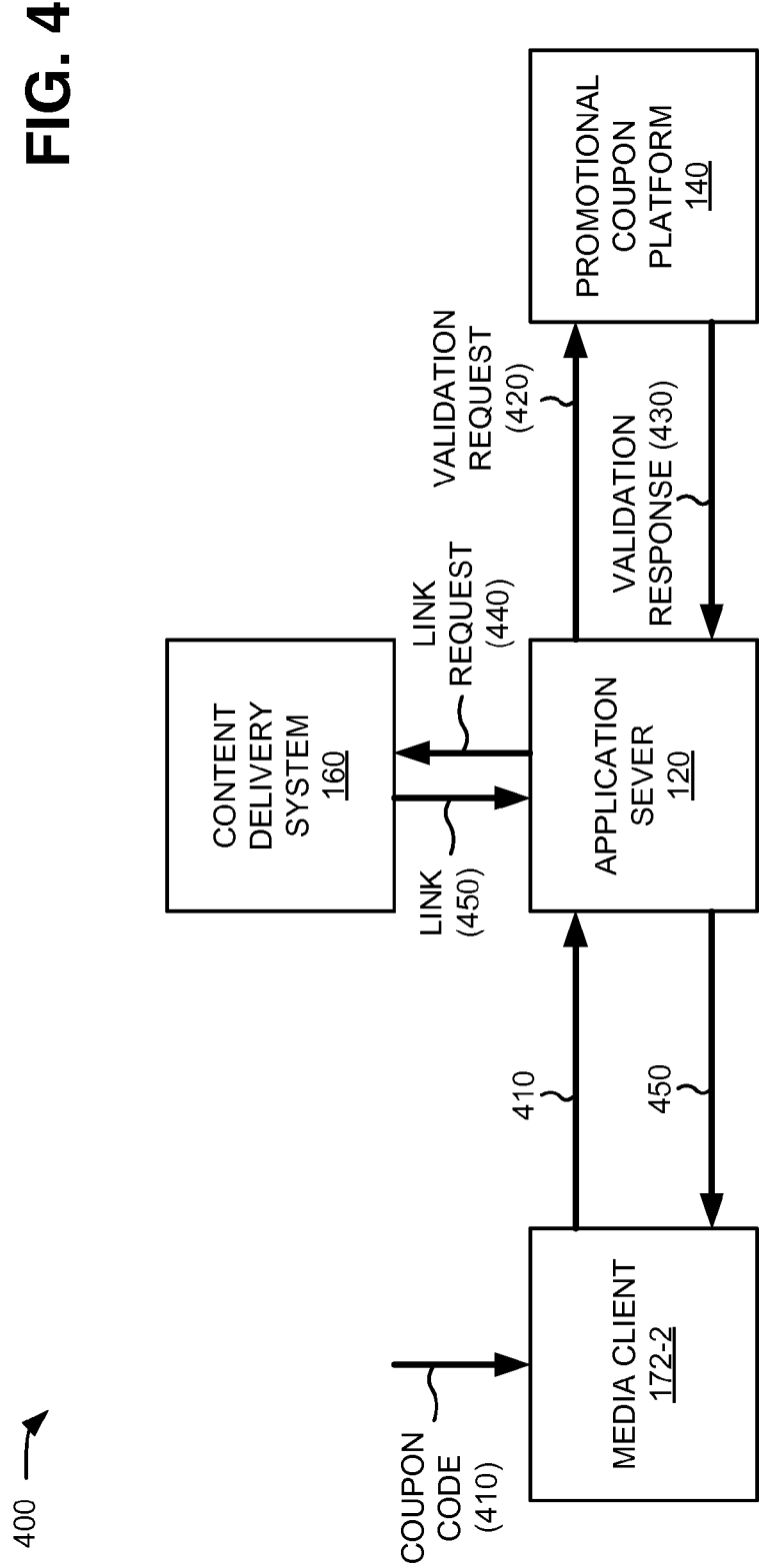
FIG. 4 is a diagram of exemplary interactions between components of another exemplary portion of the network depicted in FIG. 1.

FIG. 4 depicts a diagram of exemplary interactions among components of another exemplary portion 400 of network 100. As illustrated, network portion 400 may include application server 120, promotional coupon platform 140, content delivery system 160, and media client 172-2. Application server 120, promotional coupon platform 140, content delivery system 160, and media client 172-1 may include the features described above in connection with one or more of FIGS. 1-3.

A user may input, or cause to be input, a coupon code 410 for a GVOD coupon to media client 172-2 (e.g., a device at a GVOD-coupon recipient's premises). Coupon code 410 may correspond to, for example, coupon code 340 received on user device 180-2. For example, in one implementation, a GVOD coupon recipient may receive coupon code 340 on user device 180-2 and may use media client 172-2 to launch a gift coupon application and/or navigate (e.g., via user interface device 176-2, not shown in FIG. 4) a user interface menu to a "VOD gift redemption" selection that includes an input form to enter a GVOD coupon code. The GVOD recipient may manually enter (e.g., via user interface device 176-2) coupon code 410 for media client 172-2. In another implementation, user device 180-2 may include an application interface to automatically transfer coupon code 410 to media client 172-2.

Media client 172-2 may receive coupon code 410 and may forward coupon code 410 with other user information (e.g., a recipient name, account, etc.) to application server 120. Application server 120 may generate a validation request 420 to promotional coupon platform 140. Validation request 420 may include coupon code 410 and other user information (e.g., recipient name, media client ID, account information, etc.) to permit promotional coupon platform 140 to confirm that the recipient and coupon code 410 match a stored recipient and coupon code (e.g., coupon code 340 of FIG. 3). Assuming the request is validated, promotional coupon platform 140 may provide a validation response 430 (e.g., that authorizes a transaction for the corresponding VOD content) to application server 120.

Upon receiving validation response 430, application server 120 may provide a link request 440 to content delivery system 160. Link request 440 may include an indication of a VOD title corresponding to coupon code 410. In response to link request 440, content delivery system 160 may provide a link 450 to access VOD content corresponding to coupon code 410. Link 450 may include, for example, a uniform resource locator (URL) or another indicator from which VOD content can be accessed. Application server 120 may receive link 450 and may forward link 450 to media client 172-2. Media client 172-2 may then use link 450 to access the VOD content corresponding to coupon code 410.

Although FIG. 4 shows exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5:
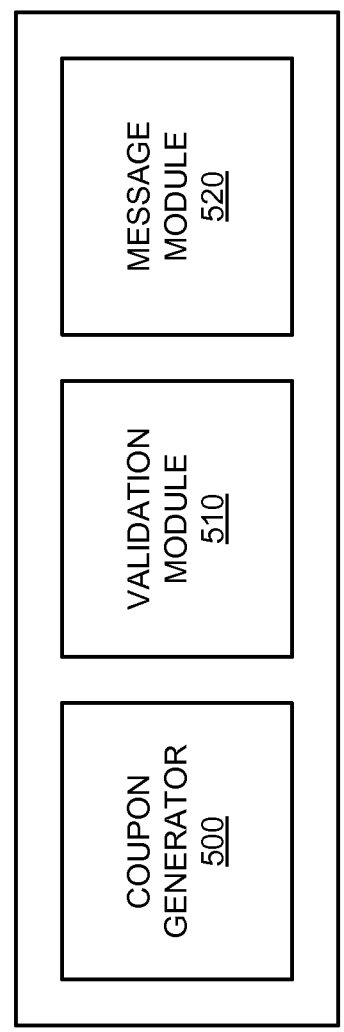
FIG. 5 is a diagram of exemplary functional components of the promotional coupon platform of FIG. 1.

FIG. 5 is a functional block diagram of exemplary components of promotional coupon platform 140. As shown in FIG. 5, promotional coupon platform 140 may include a coupon generator 500, a validation module 510, and a message module 520. Functions of coupon generator 500, validation module 510, and message module 520 may be performed by components of one or more devices 200.

Coupon generator 500 may include one or more network devices, or other types of computation or communication devices, to generate a coupon code corresponding to a GVOD order (e.g., selected title and recipient information 320). Coupon generator 500 may generate a unique alphanumeric sequence that is associated with a selected VOD title and recipient. Coupon generator 500 may store (e.g., in memory 230) the coupon code, recipient, and VOD title for later validation.

Validation module 510 may include one or more network devices, or other types of computation or communication devices, to confirm and authorize use of a GVOD coupon by a recipient. For example, when a GVOD recipient submits a coupon code (e.g., via media client 172-2), validation module 510 may confirm that the recipient and coupon code match the recipient and coupon code previously stored by coupon generator 500. If the submitted coupon code/recipient does not match the stored coupon code/recipient, validation module 510 may reject the GVOD coupon and send (or instruct another component of provider network 110 to send) a denial message to media client 172-2. If the submitted coupon code/recipient matches the stored coupon code/recipient, validation module 510 may communicate with another component of provider network 110 (e.g., application server 120, content delivery system 160) to authorize release of the VOD title associated with the coupon. For example, validation module 510 may signal application server 120 to provide (to media client 172-2) a link (e.g., a URL) that media client 172-2 can use to retrieve the gifted VOD content.

Message module 520 may include one or more network devices, or other types of computation or communication devices, to provide GVOD coupon codes to recipients. Message module 520 may use one or more communication channels to provide the GVOD coupon. Communication channels may be selected, for example, based on the contact information provided in selected title and recipient information 320. Contact information may include, for example, a phone number, an email address, or an account name associated with a recipient. Additionally, or alternatively, contact information may include a selection of stored contact from a contact list (e.g., associated with media client 172-1 or a giver's account). In one implementation, message module 520 may generate a text message indicating the GVOD coupon code, the giver, and use instructions. In another implementation, similar information may be included in an email message. Additionally, or alternatively, message module 520 may provide an internal message through a recipient's account. For example, message module 520 may generate a message that will appear in a website portal or television login screen associated with an account for the gift recipient. In other implementations, message module 520 may send a single gift recipient multiple, simultaneous transmission in different formats (e.g., both SMS and email messages).

Although FIG. 5 shows exemplary functional components of promotional coupon platform 140, in other implementations, promotional coupon platform 140 may include fewer functional components, different functional components, differently-arranged functional components, and/or additional functional components than depicted in FIG. 5. Alternatively, or additionally, one or more functional components of promotional coupon platform 140 may perform one or more other tasks described as being performed by one or more other components of promotional coupon platform 140.

Figure 6:
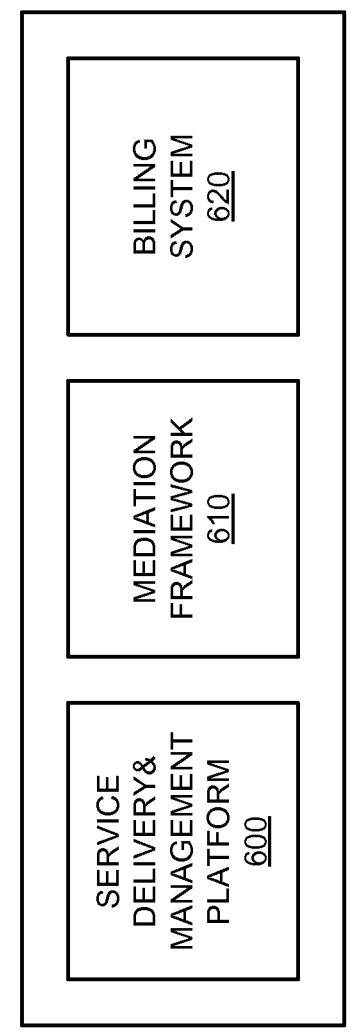
FIG. 6 is a diagram of exemplary functional components of the order processing system of FIG. 1.

FIG. 6 is a functional block diagram of exemplary components of order processing system 150. As shown in FIG. 6, order processing system 150 may include a service delivery and management platform 600, a mediation framework 610, and a billing system 620. Functions of service delivery and management platform 600, mediation framework 610, and billing system 620 may be performed by components of one or more devices 200.

Service delivery and management platform 600 may include one or more network devices, or other types of computation or communication devices, to integrate the GVOD coupon purchase into an event that can be tracked and/or billed in an enterprise environment.

Mediation framework 610 may include one or more network devices, or other types of computation or communication devices, to link event data to billing system revenue. For example mediation framework 610 may receive a record of the GVOD coupon and combine the record with other record types (e.g., voice, data, and video from wireless, wireline, mobile, or IP networks) in a consolidated database. Mediation framework 610 may also validate and standardize data, correct records containing errors, and/or distribute data to billing systems 620.

Billing system 620 may include one or more network devices, or other types of computation or communication devices, to perform processing to charge a user's account after the user purchases a GVOD coupon. In one implementation, billing system 620 may receive (e.g., from mediation framework 610) a purchase request and initiate a payment transaction via a payment gateway (e.g., a credit card change). In another implementation, billing system 620 may simply bill GVOD coupon purchases to a user's account for inclusion in a monthly (or another interval) billing statement. In one implementation, billing system 620 may also include an interface with a customer support system to permit credit adjustments and/or cancellations related to charge disputes.

Although FIG. 6 shows exemplary functional components of order processing system 150, in other implementations, order processing system 150 may include fewer functional components, different functional components, differently-arranged functional components, and/or additional functional components than depicted in FIG. 6. Alternatively, or additionally, one or more functional components of order processing system 150 may perform one or more other tasks described as being performed by one or more other components of order processing system 150.

Figure 7:
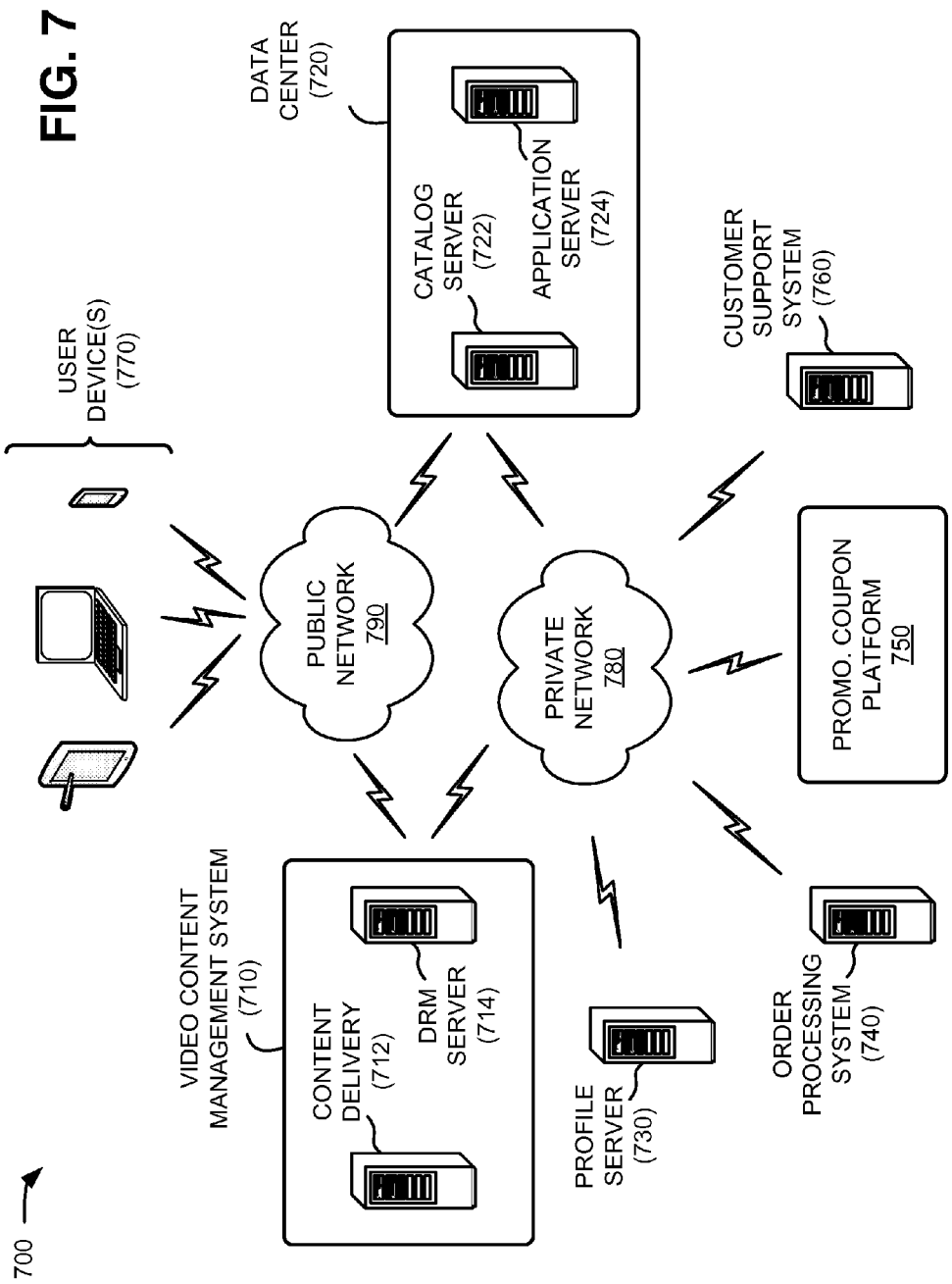
FIG. 7 illustrates another exemplary network in which systems and/or methods described herein may be implemented.

FIG. 7 is another exemplary network 700 in which systems and/or methods described herein may be implemented. Network 700 may generally represent a content distribution network to support a flexible VOD viewing (e.g., multi-screen) by users. As illustrated, network 700 may include a video content management system (VCMS) 710, a data center 720, a profile server 730, an order processing system 740, a promotional coupon platform 750, a customer support system 760, user devices 770, a private network 780, and a public network 790. The particular arrangement and number of components of network 700 shown in FIG. 7 are illustrated for simplicity. In practice there may be more VCMSs 710, data centers 720, profile servers 730, order processing systems 724, promotional coupon platforms 750, customer support systems 760, user devices 770, and/or networks 780/790. Components of network 700 may be connected via wired and/or wireless connections.

VCMS 710 may include one or more network devices, or other types of computation or communication devices, to aggregate content and content metadata, process content, and distribute content (including VOD content). In one implementation, VCMS 710 may include a content delivery system 712 and a digital rights management (DRM) server 714. VCMS 710 may aggregate content and transcode content into a digital format suitable for consumption on particular user devices 770. For example, VCMS 710 may include a transcoding device to convert a video file from one format to another (e.g., from one bit rate to another bit rate, from one resolution to another, from one standard to another, from one file size to another, etc.). VCMS 710 may also encrypt data and communicate with DRM server 714 to enforce digital rights.

Similar to content delivery system 160, content delivery system 712 may deliver digital content from a backend server to user devices 770. In one implementation, content delivery system 712 may include a streaming server that provides streaming data packets (e.g., via a streaming URL) to user devices 770 (e.g., via network 780). In one implementation, a streaming URL may be session-based, such that each URL can be used only once for one user device 770 for security purposes.

DRM server 714 may include one or more network devices, or other types of computation or communication devices, to issue, validate, and/or enforce DRM licenses to a client, such as an application running on one of user devices 770. In implementations herein, DRM server 714 may communicate with user device 770 to authenticate a user of user device 770, the particular user device 770, and/or an application residing on user device 770. For example, DRM server 714 may request/receive login information associated with the user, and compare the login information with stored information to authenticate the user. Additionally, or alternatively, DRM server 714 may request/receive device information (e.g., a unique device identifier) associated with user device 770, and may compare the device information with stored information to authenticate user device 770.

Data center 720 may include one or more network devices, or other types of computation or communication devices, to manage the authorization, selection, and/or purchase of multimedia content by a user of user devices 770. As shown in FIG. 7, data center 720 may include a catalog server 722 and an application server 724. In one implementation, data center 720 may be accessed by user devices 770 via public network 790.

Similar to catalog server 130, catalog server 722 may provide a catalog of available content for users (e.g., of user devices 770) to consume (e.g., buy, rent, gift, or subscribe to). In one implementation, catalog server 722 may collect and/or present listings of video content available to user devices 770. For example, catalog server 722 may receive digital content metadata, such as lists or categories of content, from VCMS 710. Catalog server 722 may use the content metadata to provide currently-available content options to user devices 770. Catalog server 722 may provide the content metadata to user device 770 directly or may communicate with user device 770 via application server 724.

Similar to application server 120, application server 724 may provide a backend support system for mobile applications residing on user devices 770. For example, application server 724 may permit user device 770 to download an application that may permit a user to find content of interest, gift digital content, or play digital content. The application may enable user device 770 to present to a user of user device 770 information received from data center 720 in an interactive format to allow selection of particular digital content. Additionally, or alternatively, application server 724 may provide content metadata, such as lists or categories of content. Also, application server 724 may authenticate a user who desires to purchase, rent, gift, or subscribe to digital content.

In one implementation, application server 724 may permit guest access to enable out-of-franchise users to perform limited functions, including for example ordering GVOD coupons and consuming GVOD content. In one implementation, guest access may include a limited and/or separate web-server interface that may include, for example, access to media player applications, a gift coupon application (e.g., to select, order and/or redeem GVOD coupons), on-line payment options, customer support interfaces (e.g., for coupon refunds/exchanges, payment issues, and the like), etc. In one implementation, the interactions between application server 724 and user device 770 may be performed using hypertext transfer protocol (HTTP) or secure HTTP (HTTPS) via public network 790 (e.g., the Internet).

Similar to profile server 165, profile server 730 may store user profile information for users (e.g., non-guest users of user devices 770). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 770, a video application identifier associated with the video application obtained from application server 724, or the like. Application server 724 may use the user profile information from profile server 730 to authenticate a user and may update the user profile information based on the user's activity (e.g., with a user's express permission).

In one implementation, profile server 730 may include one or more stored contact lists (e.g., for a particular user) associated with another media system, such as a digital voice system, a wireless network, etc. With authorization from the user, application server 724 may use contacts from the other stored contacts list (e.g., particular fields from each contact) to populate selectable contacts in a GVOD menu.

Similar to order processing system 150, order processing system 740 may manage charging users for services provided via network 700. Order processing system 740 may include, for example, a payment processing component, a billing component, and/or a settlement component. In one implementation, order processing system 740 may manage real-time payment transactions to support ordering of GVOD coupons by guest users.

Similar to promotional coupon platform 140, promotional coupon platform 750 may generate and validate coupon codes to support GVOD activities. Promotional coupon platform 750 may interface with application server 724, profile server 730, order processing system 740, customer support system 760, and/or user devices 770 as described further herein.

Customer support system 760 may solicit and/or receive user feedback, questions, and/or credit-related requests. In one implementation customer support system 760 may include interfaces with data center 720 and/or order processing system 740, for example, to receive problem reports and to resolve customer billing disputes. In another implementation, customer support system 760 may include an interface with VCMS 710, data center 720, and/or promotional coupon platform 750 to manage refunds and/or exchanges of GVOD coupons. For example, if a user of user device 770 receives a GVOD coupon for unwanted VOD content (e.g., previously viewed, duplicative, undesirable, etc.), customer support system 760 may enable the user view VOD titles and select an alternate VOD item of equal value. Customer support system 760 may communicate with promotional coupon platform 750 to delete and coupon code for the unwanted GVOD coupon and generate a new GVOD coupon code for the replacement VOD content.

User device 770 may include a computation or communication device to enable a user to view video content or interact with another user device 770 or a video display device (e.g., a STB and/or television). User device 770 may include, for example, a personal communications system (PCS) terminal (e.g., a smart phone that may combine a cellular radiotelephone with data processing and data communications capabilities), a tablet computer, a smart phone, a personal computer, a laptop computer, a gaming console, a media playing device, an Internet television, a digital video recorder (DVR) rental terminal, or other types of computation or communication devices.

In one implementation, user device 770 may include a client-side application that enables user device 770 to communicate with, for example, data center 720 and/or present information received from data center 720 to a user. The client-side application may permit a user of user device 770 to log into an account (e.g., via application server 724), access catalog information (e.g., from catalog server 722), submit a GVOD order (e.g., to promotional coupon platform 750), redeem a GVOD coupon, and/or consume live streaming video content (e.g., from VCMS 710). In one implementation, user devices 770 may include different front-end client applications. For example, one user device 770 may include a mobile device operating system (e.g., Google's Android OS, Apple's iOS, etc.); another user device 770 may include a laptop computer using a full-featured web browser/operating system; and still another user device 770 may include a device using a Microsoft Windows CE operating system.

In another implementation, the client-side application may initiate a connection with DRM server 714 to obtain one or more secure key(s), such as a decryption key that permits user device 770 to decrypt VOD content (e.g., associated with a GVOD coupon). For example, the client-side application may communicate with application server 724 to identify selected content and coordinate the receipt of DRM security information (e.g., from DRM server 714) with protected content from content delivery system 712. Protected content may include, for example, any content encrypted to enforce copyright restrictions.

Private network 780 may include, for example, one or more private IP networks that use a private IP address space. Private network 780 may include a local area network (LAN), an intranet, a private wide area network (WAN), etc. In one implementation, private network 780 may implement one or more Virtual Private Networks (VPNs) for providing communication between, for example, any of VCMS 710, data center 720, profile server 730, order processing system 740, promotional coupon platform 750, and/or customer support system 760. Private network 780 may be protected and/or separated from other networks, such as public network 790, by a firewall. Although shown as a single element in FIG. 7, private network 780 may include a number of separate networks.

Public network 790 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 7, public network 790 may include a number of separate networks that provide services to user devices 770.

In operation, a user (e.g., a giver) of one of user devices 770 may desire to provide a VOD gift to another user (e.g., a recipient) of one of user devices 770. The giver may access a gift coupon application via user device 770 to obtain a listing of VOD gift selections available from catalog server 722 and/or application server 724. The giver may use user device 770 to identify a particular recipient and select a particular VOD gift. In one implementation, application server 724 may retrieve, from profile server 730, stored contact information for the user to enable the giver to select a recipient from a list of known contacts. User device 770 may submit the selected VOD gift and recipient to application server 724 for processing and distribution.

Application server 724 may receive the VOD gift/recipient selection and provide the selection information to promotional coupon platform 750 and order processing system 740. Order processing system 740 may generate a billing event for the VOD gift, mediate the transaction, and bill the giver's account for the transaction (e.g., add a billing line item for the VOD gift). Alternatively, order processing system may (via application server 724) enable payment through an on-line payment transaction (e.g., using credit card information, an electronic check, or an Internet-based payment system). Promotional coupon platform 750 may generate a coupon code for the particular VOD gift and may forward the coupon code, along with use instructions and/or a URL, to the recipient. In one implementation, the coupon code/instructions may be provided to an account (e.g., an email account) that is not tied to a particular user device 770.

After receiving the coupon code/instructions from promotional coupon platform 750, the recipient may use any user device 770 to provide the coupon code to application server 724 (e.g., via the URL included with the use instructions). Application server 724 may provide the coupon code to promotional coupon platform 750 for validation. Assuming promotional coupon platform 750 is able to validate the coupon, application server 724 may provide access to the VOD content associated with the coupon code. In one example, application server 724 may provide an address or link that user device 770 may use to retrieve content from t delivery system 712. Separately, application server 724 may provide contact information for DRM server 714 to obtain decryption keys for VOD content provided from content delivery system 712.

Although FIG. 7 shows example components of network 700, in other implementations, network 700 may include fewer components, different components, differently arranged components, and/or additional components than those depicted in FIG. 7. Alternatively, or additionally, one or more components of network 700 may perform one or more tasks described as being performed by one or more other components of network 700. For example, in one implementation, the functions of catalog server 724, application server 724, or profile server 730 may be combined in a single device.

FIGS. 8A-8D illustrate an exemplary user interface 800 for ordering a VOD gift. As shown in FIG. 8A, a user may manipulate user interface device 176 to access a VOD menu 810 from media client 172/display device 174. VOD menu may include, for example, options to view a VOD catalog (e.g., "Browse VOD Titles"), give VOD content (e.g., "Give VOD"), and redeem GVOD coupons (e.g., "Redeem Coupons"). Assuming a user selects "Give VOD," media client 172 may present the user interface of FIG. 8B.

As shown in FIG. 8B, user interface 800 may include a navigation section 820 and alternate sections 830 and 840 to input a GVOD recipient. Navigation section 820 may include navigation options (e.g., "Back" and "Next"), along with a progress indication (e.g., "Step 1 of 3"). Section 830 may include a menu to select a particular contact from a list of stored contacts. The list of stored contacts may be saved from a user's previous GVOD purchases and/or imported from another account associated with the user. Section 840 may include a menu and/or input fields to manually enter (e.g., via user interface device 176) information for a gift recipient. In the implementation shown in FIG. 8B, the recipient information may include a name and phone number. In other implementations, different and/or additional recipient information may be solicited. After a user has selected a GVOD recipient via either section 830 or 840, a user may elect to continue to a next step (e.g., via selecting the "Next" option in navigation section 820) presented by the user interface of FIG. 8C.

As shown in FIG. 8C, user interface 800 may include alternate sections 850 and 860 to select a type of VOD gift. Section 850, for example, may include a menu to select a type of VOD (e.g., rent, buy/own, etc.) and a list of available titles that may be rented/owned. Section 860 may include a menu and input fields to enter (e.g., via user interface device 176) a monetary value to credit toward VOD content. After a user has selected a type of VOD gift via either section 850 or 860, a user may elect to continue to a next step (e.g., via selecting the "Next" option in navigation section 820) presented by the user interface of FIG. 8D.

As shown in FIG. 8D, user interface 800 may include a confirmation section 870 to indicate the recipient and VOD gift selected in the previous user interface menus. Confirmation section 870 may also include instructions and billing information associated with the selected GVOD event.

Figure 9A:
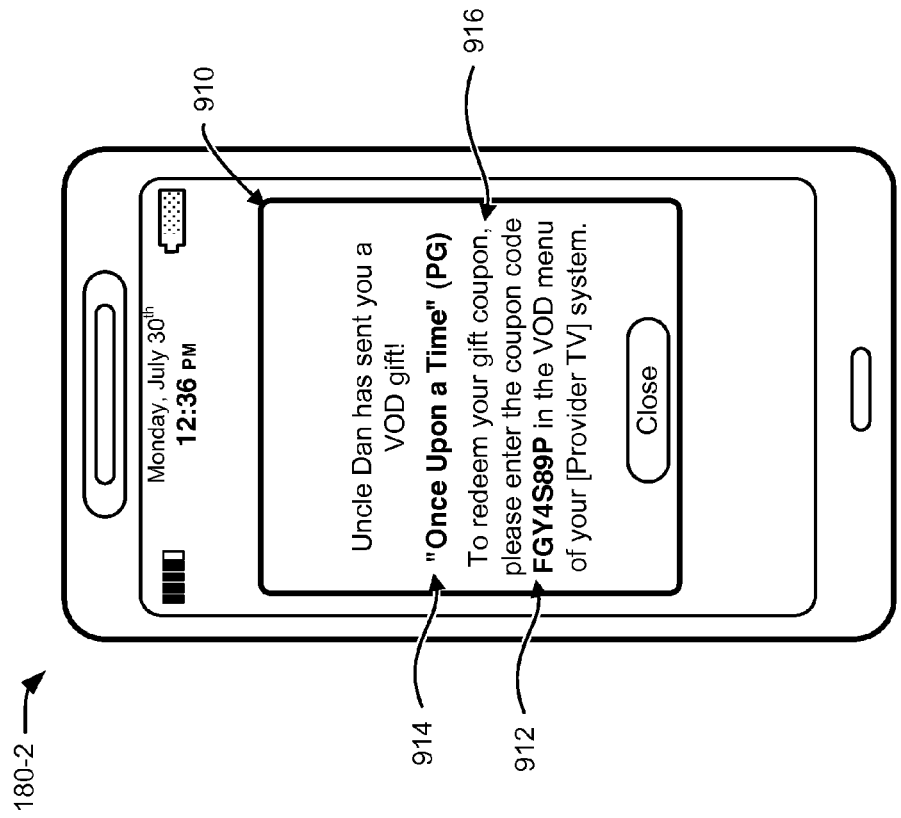

FIGS. 9A and 9B illustrate exemplary messages to VOD gift recipients that may be presented on a user device (e.g., user devices 180-2 or 770). FIG. 9A may include a message 910 directed a recipient who is a subscriber of provider network 110 (e.g., an in-franchise customer). As shown in FIG. 9A, message 910 may include a coupon code 912, a VOD title 914, and instructions 916. Coupon code 912 may include an alphanumeric string that may be associated with a VOD gift. VOD title 914 may include a title or other metadata associated with the gifted VOD content. Instructions 916 may include information to generally direct a recipient how to access the gifted VOD content on the recipient subscriber's system (e.g., using media client 172-2 or another system separate from user device 180-2).

FIG. 9B may include a message 920 directed a recipient who is not a subscriber of provider network 110 (e.g., an out-of-franchise customer). As shown in FIG. 9B, message 920 may include a coupon code 912, a VOD title 914, instructions 916, and link 918. Coupon code 912 and VOD title 914 may include features similar to those described above. Instructions 916 may include information to generally direct a recipient how to access the gifted VOD content on the recipient's user device (e.g., user device 770). Link 918 may include a URL for a web-site that may be used to access the gifted VOD content and/or obtain further information.

Although FIGS. 8A-9B show exemplary user interfaces for giving and receiving GVOD coupons, in other implementations, the user interfaces may include different information and/or arrangements than depicted in FIGS. 8A-9B.

FIG. 10 is a flow chart of an exemplary process 1000 for providing and implementing GVOD coupons, according to an implementation described herein. In one implementation, process 1000 may be performed by one or more devices of provider network 110. In another implementation, one or more blocks of process 1000 may be performed by one or more other devices or a group of devices including or excluding devices of provider network 110.

Process 1000 may include receiving input for a recipient and content of a VOD gift (block 1010) and creating a billing event for the VOD gift (block 1020). For example, as described in connection with FIG. 3, media client 172-1 may present titles 310 to a user and solicit a title selection and a gift recipient. The user's selection of the particular VOD title (or title series or monetary VOD value) and recipient may be forwarded by media client 172-1 to application server 120, as indicated by reference number 320. Promotional coupon platform 140 may forward service and billing data 330 to order processing system 150 to permit the giving user's account to be charged for the GVOD coupon. In one implementation, a GVOD order may be processed and billed to a user's account in the same manner that a subscriber would be charged for ordering and personally viewing VOD content.

Process 1000 may also include generating and storing a coupon code for the VOD gift (block 1030), and sending the coupon code to the VOD gift recipient (block 1040). For example, as described in connection with FIG. 3, promotional coupon platform 140 may generate a GVOD coupon code corresponding to selected title and recipient information 320. Promotional coupon platform 140 may forward the GVOD coupon to a recipient user's device using the contact information provided in selected title and recipient information 320. For example, if selected title and recipient information 320 includes a phone number that supports text messaging, promotional coupon platform 140 may provide coupon code 340 to user device 180-2. In one implementation, coupon code 340 may be included with additional information, such as instructions for using the GVOD coupon, a name of the giving user, etc.

Process 1000 may also include receiving, from a user device associated with the recipient, the coupon code (block 1050), and validating the coupon code from the recipient based on the stored coupon code for the VOD gift (block 1060). For example, as described above in connection with FIG. 4, a recipient user may input, or cause to be input, a coupon code 410 for a GVOD coupon to media client 172-2 (e.g., a device at a GVOD-coupon recipient's premises). Media client 172-2 may receive coupon code 410 and may forward coupon code 410 with other user information (e.g., a recipient name, account, etc.) to application server 120. Application server 120 may generate a validation request 420 to promotional coupon platform 140. Validation request 420 may include coupon code 410 and other user information (e.g., recipient name, media client ID, account information, etc.) to permit promotional coupon platform 140 to confirm that the recipient and coupon code 410 match a stored recipient and coupon code (e.g., coupon code 340 of FIG. 3). Assuming the request is validated, promotional coupon platform 140 may provide a validation response 430

(e.g., that authorizes a transaction for the corresponding VOD content) to application server 120.

Process 1000 may further include providing, to a user device of the recipient, information to enable access to the VOD gift content (block 1070). For example, as described above in connection with FIG. 4, upon receiving validation response 430, application server 120 may provide a link request 440 to content delivery system 160. Link request 440 may include an indication of a VOD title corresponding to coupon code 410. In response to link request 440, content delivery system 160 may provide a link 450 to access VOD content corresponding to coupon code 410. Link 450 may include, for example, a URL or another indicator from which VOD content can be accessed. Application server 120 may receive link 450 and may forward link 450 to media client 172-2. Media client 172-2 may then use link 450 to access the VOD content corresponding to coupon code 410.

Systems and/or methods described herein may provide for gifting of VOD content. The systems and/or methods may permit individual VOD titles, VOD series, and/or monetary values to be given between subscribers within a provider network or out-of-franchise users. VOD gift coupons may be delivered to recipient accounts outside the limits of the provider's VOD network using, for example, phone numbers, email, or other contact information provided by a giving user.

The foregoing description provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method performed by one or more network devices, comprising:
providing, to a first user device associated with a giver, a user interface to enable out-of-franchise users to order video-on-demand (VOD) gifts from a provider network;
receiving, from the first user device associated with the giver, a request for a VOD gift, wherein the request identifies a recipient and a VOD selection;
creating a billing event, corresponding to the VOD gift, for an account associated with the giver;
generating, in response to receiving the request, a coupon code for the VOD gift, wherein the coupon code is based on both the identified recipient and the VOD selection;
sending, to a second user device associated with the recipient, a first indication of the VOD gift that includes the coupon code, when the recipient is a subscriber of the provider network;
sending, to the second user device associated with the recipient, a second indication of the VOD gift that includes the coupon code and a link to access the VOD gift, when the recipient is not a subscriber of the provider network, wherein the second indication is different than the first indication;
receiving, from a third user device associated with the recipient, the coupon code; and
providing, to the third user device, information to enable access to VOD content corresponding to the coupon code.

2. The method of claim 1, further comprising:
providing, to the first user device, a user interface to solicit identification information for the recipient and the VOD selection.

3. The method of claim 2, wherein the user interface includes access to one or more stored contacts from an address book or contact list associated with another account for the giver, to populate selectable contacts in the user interface to solicit identification information for the recipient.

4. The method of claim 2, wherein the user interface is a web page that is accessible via a public network.

5. The method of claim 1, wherein the VOD selection includes one of:
a particular VOD item,
a series of VOD content, or
a monetary credit toward a variety of VOD content.

6. The method of claim 1, wherein the billing event includes one of:
an on-line payment transaction, or
a line item for an existing subscription account.

7. The method of claim 1, wherein sending the first indication of the VOD gift or the second indication of the VOD gift includes sending one or more of:
a Short Message Service (SMS) message,
an instant message (IM),
a mobile IM (MIM), or
an email message.

8. The method of claim 1, wherein the second user device and the third user device are the same communication device.

9. The method of claim 2, further comprising:
  storing, in a memory and based on the request for the VOD gift, the coupon code generated for the VOD gift, the recipient identification information, and the VOD selection; and
  validating the coupon code received from the third user device based on the stored coupon code for the VOD gift.

10. The method of claim 1, further comprising:
  receiving, from the third user device, a request to access the VOD content based on the information to enable access to the VOD content; and
  providing, to the third user device, the VOD content corresponding to the coupon code.

11. The method of claim 1, wherein the first user device is a media client with a proprietary interface to a VOD provider network.

12. One or more network devices, comprising:
  one or more memories to store a plurality of instructions; and
  one or more processors configured to execute instructions in the one or more memories to:
    provide, to a first user device associated with a first giver that is a subscriber of a provider network, a first user interface for a video-on-demand (VOD) gift system,
    provide, to a second user device associated with a second giver that is not a subscriber of the provider network, a second user interface for the gift system that is different than the first user interface, wherein the first user interface and the second user interface are configured to solicit contact information for a recipient and a VOD gift selection;
    receive, from the first user device via the first user interface or from the second user device via the second user interface, a request for a VOD gift, wherein the request includes the contact information for the recipient and the VOD gift selection;
    create a billing event, corresponding to the VOD gift, for an account associated with the first giver or the second giver;
    generate, in response to receiving the request, a coupon code for the VOD gift, wherein the coupon code is based on both the contact information for the recipient and the VOD gift selection;
    send, to a third user device associated with the recipient and based on the contact information, a first indication of the VOD gift when the recipient is a subscriber of a provider network, wherein the first indication includes the coupon code;
    send, to the third user device associated with the recipient and based on the contact information, a second indication of the VOD gift when the recipient is not a subscriber of the provider network, wherein the second indication includes the coupon code and a link to access the VOD gift;
    provide, to a fourth user device, a third user interface to solicit the coupon code;
    receive, from the fourth user device and via the third user interface, the coupon code; and
    provide, to the fourth user device, information to enable the fourth user device to access VOD content corresponding to the coupon code.

13. The one or more network devices of claim 12, wherein the memory is further configured to store the coupon code generated for the VOD gift and the VOD gift selection, and wherein the one or more processors are further configured to:
  validate the coupon code received from the fourth user device based on the stored coupon code generated for the VOD gift.

14. The one or more network devices of claim 12, wherein the first user device and the fourth user device include a set-top box, and wherein the second user device and the third user device each include one or more of:
  a cellular phone,
  a laptop computer,
  a tablet computer,
  a personal computer,
  a game console,
  a personal communications system (PCS) terminal,
  a media player,
  a personal digital assistant (PDA), or
  a smartphone.

15. The one or more network devices of claim 12, wherein the first user interface includes access to one or more stored contacts associated with another account for the subscriber giver, and wherein the stored contacts may be selected by the subscriber giver to identify the recipient.

16. The one or more network devices of claim 12, wherein the information to enable the fourth user device to access VOD content corresponding to the coupon code includes:
  a uniform resource locator (URL) to access the VOD content.

17. The one or more network devices of claim 12, wherein the VOD gift selection includes one of:
  a particular VOD item,
  a series of VOD content, or
  a monetary credit toward a variety of VOD content.

18. A system, comprising:
  a catalog device configured to provide a list of video-on-demand (VOD) content available for gifting;
  an application device configured to:
    selectively provide, to a first user device associated with a giver, either of an in-franchise user interface or an out-of-franchise user interface for a video-on-demand (VOD) gift system of a provider network, wherein both of the in-franchise user interface and the out-of-franchise user interface are configured to solicit contact information for a recipient and a VOD gift selection based on the list of VOD content, and
    receive, from the first user device and via the in-franchise user interface or the out-of-franchise user interface, a request for a VOD gift, wherein the request includes the contact information for the recipient and the VOD gift selection;
  an order processing system configured to create a billing event, corresponding to the VOD gift, for an account associated with the giver; and
  a coupon platform configured to:
    generate, in response to receiving the request, a coupon code for the VOD gift, wherein the coupon code is based on the contact information for the recipient and the VOD gift selection,
    send, to a second user device associated with the recipient and based on the contact information, a first indication of the VOD gift when the recipient is a subscriber of the provider network, wherein the first indication includes the coupon code,
    send, to the second user device associated with the recipient and based on the contact information, a second indication of the VOD gift when the recipient is not a subscriber of the provider network, wherein the second indication includes the coupon code and a link to access the VOD gift, store the coupon code generated for the VOD gift and the VOD gift selection, and validate a coupon code received from a recipient based on the stored coupon code generated for the VOD gift.

19. The system of claim 18, wherein the application device is further configured to:

provide, to another user device associated with the recipient, a different user interface to solicit the coupon code;

receive, via the different user interface, the generated coupon code; and provide, to the other user device, information to enable the other user device to access VOD content corresponding to the generated coupon code.

20. The system of claim 18, further comprising:

a customer support system configured to interface with the catalog device, the application device, and the coupon platform to manage an exchange of the VOD gift selection associated with the generated coupon code.

\* \* \* \* \*